J. O. HOLMQUIST.
SELF SQUARING CURTAIN STRETCHER.
APPLICATION FILED NOV. 27, 1911.
Reissued Mar. 5, 1912.
13,379.
2 SHEETS—SHEET 1.
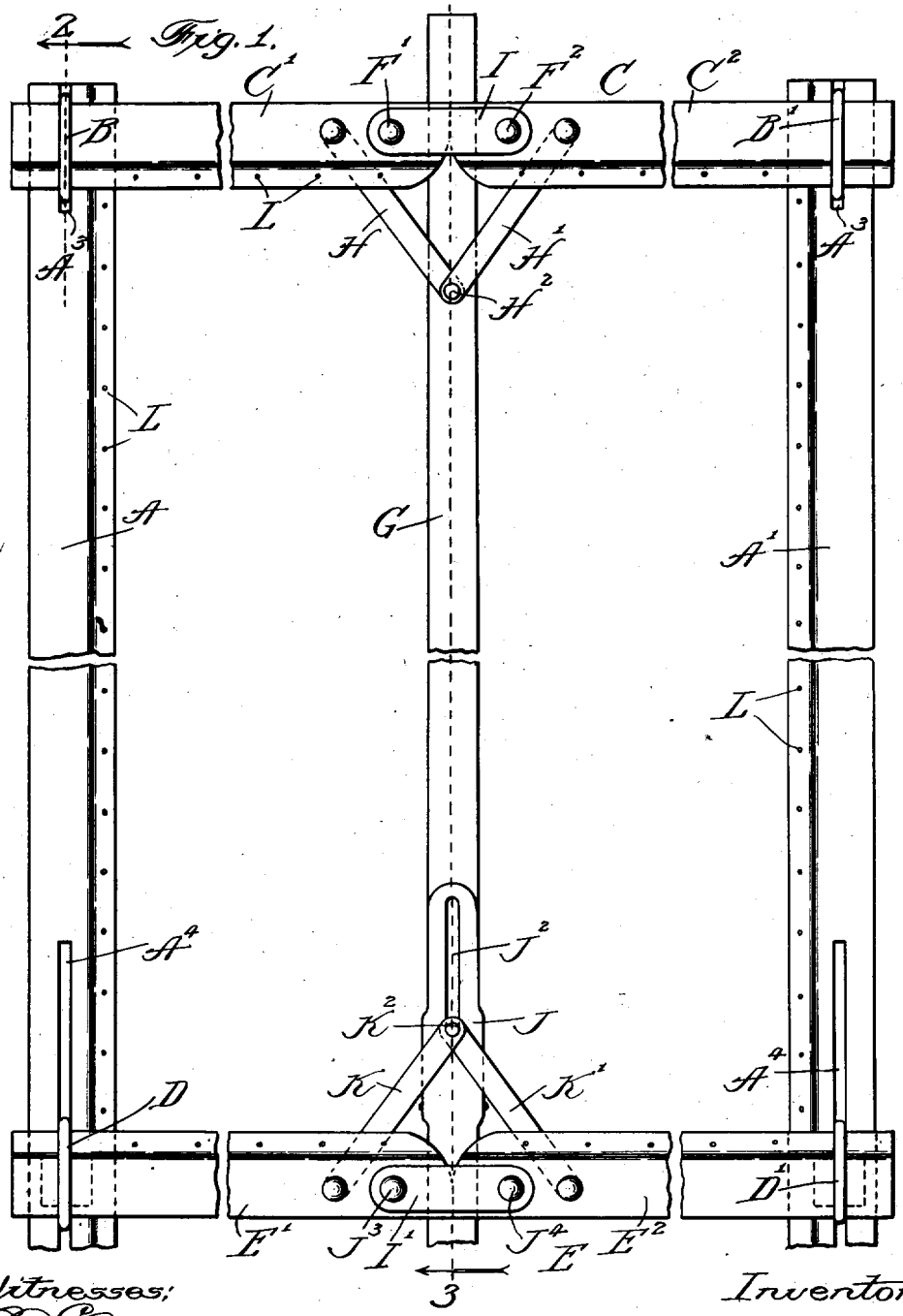
Witnesses:
Geo. E. Clayford.
G. T. Chase.
Inventor:
John Otto Holmquist,
By Dyer, Horth, Lee, Chritton & Wilks,
Atty's.
COLUMBIA PLANOGRAPH CO., WASHINGTON, D. C.

J. O. HOLMQUIST.
SELF SQUARING CURTAIN STRETCHER.
APPLICATION FILED NOV. 27, 1911.
Reissued Mar. 5, 1912.
13,379.
2 SHEETS—SHEET 2.
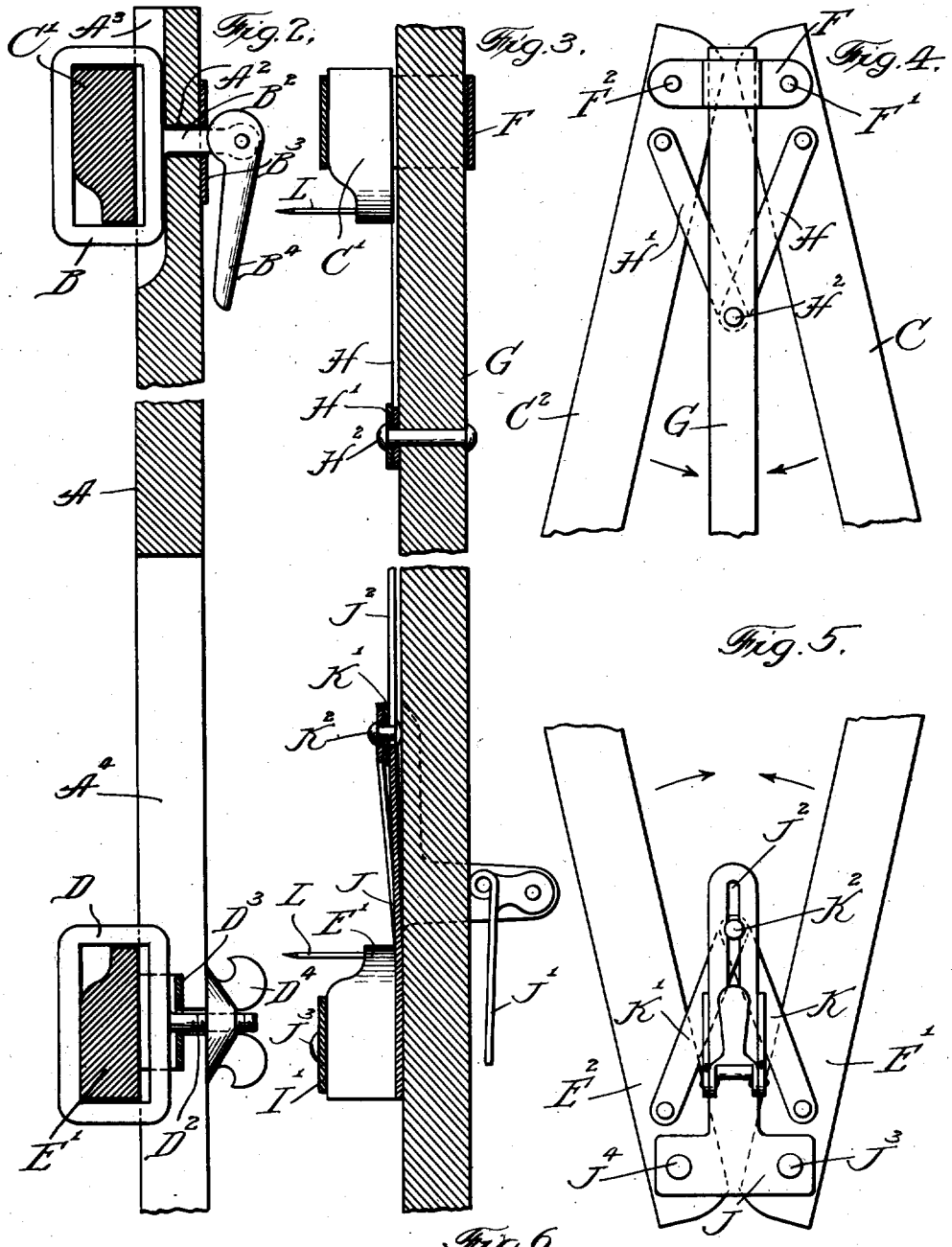
Witnesses:
Chas. E. Clayford.
G. T. Chase.
Inventor:
John Otto Holmquist,
By Dyer, Foster, Lee, Brown & Wilson
Attys.
COLUMBIA PLANOGRAPH CO., WASHINGTON, D. C.

UNITED STATES PATENT OFFICE.

JOHN OTTO HOLMQUIST, OF CHICAGO, ILLINOIS.

SELF-SQUARING CURTAIN-STRETCHER.

13,379. Specification of Reissued Letters Patent. Reissued Mar. 5, 1912.

Original No. 992,717, dated May 16, 1911, Serial No. 577,952. Application for reissue filed November 27, 1911. Serial No. 662,782.

*To all whom it may concern:*

Be it known that I, JOHN OTTO HOLMQUIST, a citizen of the United States, and a resident of Chicago, in the county of Cook and State of Illinois, have invented certain new and useful Improvements in Self-Squaring Curtain-Stretchers; and I do hereby declare the following to be a full, clear, and exact description of the invention, such as will enable others skilled in the art to which it appertains to make and use the same.

The object of the invention is to provide a new and improved self-squaring curtain stretcher, arranged to permit convenient folding when not in use, and to allow moving its side bars and end bars into square position relative one to the other when opening the stretcher, to insure proper accurate stretching of the curtain while drying the same. For the purpose mentioned the end bars of the stretcher frame are made in sections pivotally connected with each other, and engaged by a guide bar and links to insure proper opening and closing of the sections.

A practical embodiment of the invention is represented in the accompanying drawings forming a part of this specification, in which similar characters of reference indicate corresponding parts in all the views.

Figure 1 is a plan view of the curtain stretcher; Fig. 2 is an enlarged sectional side elevation of the same on the line 2—2 of Fig. 1; Fig. 3 is a similar view of the same on the line 3—3 of Fig. 1; Fig. 4 is an inverted plan view of the upper end bar partly folded; Fig. 5 is a similar view of the lower end bar partly folded; and Fig. 6 is an end view of one of the shoes.

The frame of the curtain stretcher consists of the side bars A, $A^1$, and is provided at the upper end with clamping loops B, $B^1$ slidingly engaged by the ends of the upper end or cross bar C, and the lower ends of the side bars A, $A^1$ are provided with clamping loops D, $D^1$ engaged by the terminals of the lower end or cross bar E. The upper end bar C is made in sections $C^1$, $C^2$, pivotally connected with each other by a guideway F, slidingly engaged by a guide rod G pivotally connected by diverging link H, $H^1$ with the sections $C^1$ and $C^2$, as plainly indicated in the drawings. The guideway F is preferably arranged on the under side of the end bar C while the top is provided with a connecting link I for the sections $C^1$, $C^2$, it being understood that the pivots $F^1$, $F^2$ for connecting the guideway F to the sections $C^1$, $C^2$ also engage the connecting plate I. The pivot $H^2$ connecting the diverging links H and $H^1$ with the guide bar G is a distance from the guideway F, and hence when the sections $C^1$ and $C^2$ are moved into an extended position as shown in Fig. 1, they move finally into alinement with each other, thus standing at right angles to the side bars A, $A^1$. When the end bar C is disengaged from the loops B, $B^1$, the sections $C^1$, $C^2$ can be readily swung toward each other into folding position, as indicated in Fig. 4, so as to take up very little room when the curtain stretcher is not in use.

The end bar E is made in sections $E^1$, $E^2$, pivotally connected with each other by a guideway J for the passage of the guide rod G, the guideway J being provided with a clamping lever $J^1$ adapted to engage the under side of the guide rod G, to clamp the latter in place after the sections $E^1$, $E^2$ are extended or moved in alinement with each other, so as to extend at right angles to the side bars A, $A^1$. Diverging links K, $K^1$ are pivotally connected with the sections $E^1$, $E^2$ and are pivotally connected with each other by a pivot pin $K^2$, slidingly engaging a lengthwise-extending slot $J^2$ formed in the guideway J. Thus when the clamping lever $J^1$ is moved by the operator out of clamping engagement with the guide rod G and the terminals of the end bar E are disengaged from the loops D, $D^1$ then the sections $E^1$, $E^2$ can be readily folded, as indicated in Fig. 5, it being understood in this connection that the guide rod G is disengaged (unclamped) from the guideway J when folding the sections $E^1$, $E^2$. The guideway J is attached to the under side of the sections $E^1$, $E^2$, and the latter are connected with each other on the top by a plate $I^1$ held in place by the pivots $J^3$, $J^4$ used for attaching the guideway J to the sections $E^1$, $E^2$. It should be added that the lower end of the pivot $K^2$ is clamped between the slotted shank of the member J and the upper surface of the bar G when the clamping lever $J^1$ is in the position shown in Fig. 3; also, that the clamping pressure is removed when the lever $J^1$ is thrown to the opposite position, permitting the folding to be effected after the brace-bar is unclamped, *i. e.*, disengaged from the clamped position, but while the brace-bar remains in its channel in the guide J.

It is understood that by the arrangement described, both end bars C and E when extended move into right-angled positions relative to the side bars A, $A^1$, so that the sectional end-bars are practically self-alining and the frame of the stretcher is practically self-bracing.

Each of the loops B, $B^1$ is provided with a shank $B^2$ extending rearwardly and passing through an aperture $A^2$ formed in the corresponding side bar A or $A^1$, and also with a washer $B^3$, as plainly indicated in Fig. 2, the washer $B^3$ being engaged by the cam end of a cam lever $B^4$ fulcrumed on the rear end of the shank $B^2$. The loop B or $B^1$ extends with its bottom part into a groove $A^3$ formed lengthwise in the upper face of the side bar A or $A^1$. Now when the terminals of the end bar C engage the loops B, $B^1$ and the cam levers $B^4$ are moved by the operator into active position, then the said loops B, $B^1$ are drawn downward to clamp the end bar C firmly in place on the upper faces of the side bars A, $A^1$. The clamping loops D, $D^1$ slidably engage lengthwise-extending grooves $A^4$ formed in the bars A, $A^1$, so as to accommodate curtains of different widths, and each of the clamping loops D, $D^1$ is provided with a threaded shank $D^2$ extending through the slot $A^4$ and through the bottom of a shoe $D^3$ slidingly engaging the slot $A^4$. The threaded end of the shank $D^2$ is engaged by a wing nut $D^4$ abutting against the under surface of the corresponding side bar A, $A^1$, so that when the wing nut $D^4$ is screwed up, the loop D or $D^1$ is drawn downward to clamp the end bar E in position on the corresponding side bar A or $A^1$. The shoe $D^3$ is preferably provided with side flanges $D^5$, fitting onto the top of the corresponding side bar A or $A^1$, so that when the wing nut $D^4$ is loosened the loop D or $D^1$ can be readily adjusted lengthwise on the side bar A, $A^1$ and with it the shoe $D^3$.

It may be explained that the sectional bars are herein termed end-bars, for the reason that the frame is commonly supported easel-wise, with the bar C at the top and the bar E at the bottom. The sectional end-bars are commonly of greater length, however, than the side bars A, $A^1$; and the curtain is usually stretched with its ends attached to the bars A, $A^1$ and its lateral edges attached to the bars C and E. The guide-bar G serves, of course, as a brace-bar for the sectional end-bars when the frame is set up. The desired size to suit the width of the curtain can usually be obtained by adjustment of the lower end-bar E toward the bar C, while both side-bars are adjustable toward the brace-bar to suit the length of the curtain. The side-bars and end-bars are provided with any suitable curtain-attaching means, such as the pins L.

The preferred manner of folding the frame is to loosen the corner-clamps B, $B^1$ and D, $D^1$ and remove the bars A, $A^1$, after which the clamp J may be loosened and the sectional end-bars folded on the brace-bar, the joints of the sectional bars "breaking" outwardly or away from each other in this operation.

Having thus described my invention, I claim as new and desire to secure by Letters Patent:

1. A curtain stretcher having oppositely disposed bars, each made in sections hingedly connected with each other, guideways held on the said bars at the joints of their sections, a guide rod slidingly engaging the said guideways, links connecting the guide rod with the sections of one of the bars, links pivotally connected with the sections of the other bar and slidingly connected with the guideway located at the last mentioned bar, and a locking device on this guideway for locking the guide rod in position.

2. A curtain stretcher, comprising side bars, end bars made in sections, a guideway for each end bar extending across the joint of the sections of the end bar and pivotally connected with the sections, a guide rod engaging the said guideways, diverging links pivotally connecting the guide rod with the sections of one end bar, diverging links pivotally connected with the sections of the other end bar and slidingly connected with the guideway at the last mentioned end bar, and clamping loops held on the side bars and engaged by the free ends of the said end bars.

3. A curtain stretcher, comprising side bars provided with clamping loops, end bars slidingly engaging the said clamping loops and each made in sections, a guide rod in alinement with the joints of the sections of the said end bars, guideways extending across the joints of the sections of the end bars and pivotally connected with the said sections, one of the guideways having a slot and a clamping lever, the said guide rod slidingly engaging the said guideways and adapted to be locked in place by the said clamping lever, diverging links pivotally connecting the guide rod with the sections of one end bar, and diverging links pivotally connected with the sections of the other end bar and slidingly engaging the said slot.

4. A curtain stretcher provided with a side bar having a lengthwise-extending slot, a shoe slidable in the said slot, a clamping loop engaging the said shoe and provided with tightening means, and an end bar slidingly engaging the said loop and adapted to rest on the said shoe.

5. A curtain stretcher comprising a guide rod, a sectional bar at each end of the guide rod, one of the said bars being slidable on the rod, means for limiting the movement of the said bar, means for locking the sections of the bars in alined position, and a side bar at each side of the guide rod, each of said side bars being slidably connected to the adjacent sections of the end bars, and means for locking each section to the adjacent side bar.

6. A self-squaring curtain-stretcher, comprising a pair of oppositely "breaking" sectional bars, each of said bars composed of two alined sections, a guide-rod crossing the joints of said sectional bars, a guide-member having a head-portion pivotally joined to each section of one of said bars and having a rigidly carried inwardly extending stem, links having their outer ends pivotally joined to said last-mentioned sections, means adjustably connecting said links, stem and guide bar together, a guide-member pivotally connected with each of the sections of the other one of said bars, links pivotally connected at their outer ends with said last-named sections, and means pivotally connecting the inner ends of said last-named links to said guide-bar.

7. A self-squaring curtain-stretcher, comprising a pair of oppositely "breaking" sectional bars, each of said bars composed of a pair of alined abutting sections with rounded inner corners, a guide-member on the lower side of each sectional bar and pivotally joined to the sections thereof, one of said guide-members having an inwardly extending shank provided with means for embracing the edges of a guide-rod, a guide-rod beneath the plane of the frame and received by said guide-members, links pivotally connected at their outer ends to the sections of one of said bars, means adjustably connecting the inner ends of said links, said shank and said guide-rod together, and links pivotally connected at their outer ends to the sections of the other bar and pivotally connected at their inner ends to the adjacent portion of said guide-bar.

8. A self-squaring, adjustable-size curtain-stretcher, comprising a pair of sectional end-bars, each end-bar composed of two alined sections and a guide-member pivotally joined to the meeting ends of each section, the joint of each sectional end-bar adapted to "break" outwardly, a pair of links joined to the sections of each end-bar, the members of each pair converging inwardly, a guide-bar having its ends slidably received by said guides, pivotal connections between the inner ends of said links and said guide-bar near its ends, the guide-bar being longitudinally shiftable with relation to one set of links, side-bars, and adjustable connections between said side-bars and the free ends of the sectional end-bars, said last-named connections permitting the frame to be adjusted in both length and breadth.

9. A self-squaring curtain-stretcher, comprising a pair of oppositely disposed sectional bars, each composed of two alined sections, guide-members crossing the joint where the sections of each bar meet and pivotally joined to said sections, said sectional bars adapted to "break" outwardly, a guide-rod having its opposite ends received slidably by said guides, and a pair of links pivotally joined to said guide-rod near each end thereof, each pair of links having the outer ends of its members pivotally connected with the adjacent bar-sections, and the pivotal connection between one pair of said links and said guide-rod being adjustable.

10. A guide-bar connection for curtain-stretchers, comprising a T-form guide-member having a head adapted for pivotal connection with a pair of bar-sections at opposite sides of the joint and having, also, a shank flanged to receive the guide-bar and equipped with means for securing the guide-bar in adjusted relation.

JOHN OTTO HOLMQUIST.

In presence of—

R. A. Raymond,

O. C. Avisus.

---

Copies of this patent may be obtained for five cents each, by addressing the "Commissioner of Patents, Washington, D. C."